US007769509B2

(12) United States Patent
Gaughan et al.

(10) Patent No.: US 7,769,509 B2
(45) Date of Patent: Aug. 3, 2010

(54) FREIGHT CAR EVENT RECORDER

(75) Inventors: Edward W. Gaughan, Greensburg, PA (US); Robert D. Dimsa, Jefferson Hills, PA (US); Gary M. Sich, Irwin, PA (US); Michael J. Veltri, Pittsburgh, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 881 days.

(21) Appl. No.: 11/607,831

(22) Filed: Dec. 1, 2006

(65) Prior Publication Data

US 2008/0129480 A1 Jun. 5, 2008

(51) Int. Cl.
*G06F 7/00* (2006.01)
(52) U.S. Cl. ........................................................ 701/29
(58) Field of Classification Search .................... 701/19, 701/29–31, 35
See application file for complete search history.

(56) References Cited

U.S. PATENT DOCUMENTS

| 4,041,470 | A | 8/1977 | Slane et al. |
| 4,487,060 | A | 12/1984 | Pomeroy |
| 5,201,834 | A | 4/1993 | Grazioli et al. |
| 5,709,436 | A | 1/1998 | Scott |
| 5,744,707 | A | 4/1998 | Kull |
| 5,808,909 | A | 9/1998 | Rees |
| 6,301,531 | B1 | 10/2001 | Pierro et al. |
| 6,327,894 | B2 | 12/2001 | Vaughn |
| 6,425,282 | B2 | 7/2002 | Vaughn |
| 6,474,150 | B1 | 11/2002 | Berg et al. |
| 6,748,303 | B2 | 6/2004 | Hawthorne |
| 6,837,550 | B2 | 1/2005 | Dougherty et al. |
| 6,850,869 | B2 | 2/2005 | Pierro et al. |
| 6,980,127 | B2 | 12/2005 | Lumbis et al. |
| 7,054,777 | B2 | 5/2006 | Crane et al. |
| 2004/0122566 | A1 | 6/2004 | Horst et al. |
| 2006/0074581 | A1 | 4/2006 | Crane et al. |
| 2006/0290199 | A1* | 12/2006 | Beck et al. ..................... 303/7 |

FOREIGN PATENT DOCUMENTS

SU 783084 11/1980

* cited by examiner

*Primary Examiner*—Kim T Nguyen
(74) *Attorney, Agent, or Firm*—The Webb Law Firm

(57) ABSTRACT

A fixedly mountable event recorder for a railcar for monitoring performance of a brake system thereof includes (a) at least one port for receiving air from one or more brake system components; (b) at least one sensor for determining a pressure of the air received from the one or more brake system components; (c) a processor operative for analyzing the determined pressure to determine an operational condition of the brake system; and (d) an indicator configured to visually convey the operational condition of the brake system. The indicator includes a plurality of activatable visual indicia corresponding to a plurality of predefined operational condition status qualifiers associated with a corresponding plurality of predefined ranges of operational conditions. The predefined ranges of operational conditions are defined as a function of expected pressures associated with the respective one or more brake system components during corresponding operational conditions thereof.

20 Claims, 2 Drawing Sheets

FREIGHT CAR EVENT RECORDER

BACKGROUND OF THE INVENTION

1. Field of the Invention

The present invention relates generally to a system for conveying the operational condition of a railcar brake system.

2. Description of Related Art

A train consist typically includes a lead locomotive and one or more remote locomotives and railcars, comprehensively referred to as rolling stock. Each piece of rolling stock has braking equipment including, among other components, a section of brake pipe, a control valve, a brake cylinder, an emergency reservoir and an auxiliary reservoir. The brake pipe sections are connected forming a brake pipe that extends the length of the consist. The control valve directs pressurized air into and out of the brake cylinder as a result of changes in the level of brake pipe pressure. To apply train brakes, the brake pipe pressure decreases at a specified rate, which determines the percentage (e.g., amount of pressure) of brake applied.

Proper functioning of the braking system for each piece of rolling stock in a train consist is important in maintaining safe and efficient operation of the consist. Improper functioning of braking equipment in a train consist may cause loss of efficiency, for example, excessive fuel consumption or increased wear on wheels and brake shoes. Thus, regular brake equipment testing, diagnostics and maintenance are required.

Prior art brake testing and diagnosing devices are disclosed in U.S. Pat. No. 5,808,909 to Rees, U.S. Pat. No. 6,327,894 to Vaughn and U.S. Pat. No. 6,837,550 to Dougherty et al. Specifically, these patents disclose portable testers that need to be transported between railcars in order to test each railcar. These portable testers either directly or indirectly connect to various brake system ports of the railcar to receive pressure data therefrom for further analysis. However, the prior art testers provide a highly inefficient manner of obtaining the condition of the brake system.

With respect to the Rees and Vaughn patents, the testers are cumbersome in size and in connectivity. For example, the testers need to be connected to various ports situated in various areas of the railcar. The tedious act of connecting and reconnecting conduits to ports needs to be done for each railcar. With respect to the Dougherty patent, the only manner in which the operational condition of the brake system may be viewed is by utilizing a hand-held wireless device, which may easily be lost. The drawbacks of the invention disclosed in the Dougherty patent include, for example, the added expense of such wireless devices and the issue of availability of such wireless devices at various stations. Furthermore, the prior art is only capable of performing testing while the train and its railcars are stationary.

It is, therefore, desirable to overcome the above problems and others by providing a system and method for efficiently conveying the operational condition of a railcar brake system.

SUMMARY OF THE INVENTION

The present invention is directed to an event recorder configured to visually convey the operational condition of a brake system on a railcar. Generally, the event recorder is configured to analyze the pressure data received from various braking components and, based upon such analysis, determine the operational condition of the brake system. The event recorder is configured to translate the operational condition into dynamic visual indicia (e.g., status LEDs) that allow maintenance personnel to quickly perceive the condition of the brake system on the respective railcar. For example, a green LED indicates "good performance", a yellow LED indicates "abnormal performance" and a red LED indicates "attention needed". The event recorder may store the data for a set period of time so that the data may be downloaded for further review (e.g., to determine the specific faults detected). The event recorder may be powered by a battery, although, alternatively, an air generator or solar array may be used.

Briefly, according to this invention, there is provided an event recorder fixedly mountable on a railcar for monitoring performance of a brake system thereof. Generally, the event recorder includes at least one port for receiving air from one or more brake system components (e.g., emergency reservoir, auxiliary reservoir, brake pipe, brake cylinder); at least one sensor (e.g., transducer) for determining a pressure of the air received from the one or more brake system components; a processor operative for analyzing the determined pressure to determine an operational condition of the brake system; and an indicator configured to visually convey the operational condition of the brake system.

The event recorder may include an analog-to-digital converter configured to convert an analog voltage received from the sensor into a digital signal representative of the respective determined pressure. The event recorder may include memory for storing the determined pressures.

The processor is operative for comparing the determined pressures of the one or more brake system components to the expected pressures associated with the respective one or more brake system components to determine the operational condition of the brake system. In another embodiment, the processor may be operative for applying an algorithm to the respective determined pressures to determine the operational condition of the brake system. The processor is further operative for establishing a signal representative of the operational condition of the brake system and the indicator is configured to visually convey the operational performance of the brake system based upon the signal representative of the operational condition of the brake system.

The indicator includes a plurality of activatable visual indicia corresponding to a plurality of predefined operational condition status qualifiers associated with a corresponding plurality of predefined ranges of operational conditions. The predefined ranges of operational conditions may be defined as a function of expected pressures associated with the respective one or more brake system components during corresponding operational conditions thereof. The plurality of predefined operational condition status qualifiers may be selected from the group including normal operation, abnormal operation and inspection needed. The plurality of activatable visual indicia may include a lighting arrangement having one or more LEDs. The one or more LEDs may be configured to emit a distinct color corresponding to a respective predefined operational condition status qualifier.

The event recorder may also include a communications port communicatively connected to the processor and configured to transmit the determined pressure external from the event recorder. The communications port may be a wired or wireless data transmission interface. The event recorder may also include a power source, such as a battery, an air generator powered by brake cylinder exhaust or a solar array.

A method for monitoring performance of a brake system of a railcar includes the steps of receiving air from an emergency reservoir, an auxiliary reservoir, a brake pipe and a brake cylinder of the brake system. Thereafter, the pressure of the respective air received is determined. The determined pressure is then analyzed to determine an operational condition of the brake system. Finally, the condition of the brake system is visually conveyed by either (a) activating a first visual indicia, wherein the first visual indicia corresponds to a normal operational condition of the brake system, or (b) activating a second visual indicia, wherein the second visual indicia corresponds to an abnormal operational condition of the brake system. Other visual indicia may be utilized to indicate other qualified operational conditions. The receipt of the respective air, the determination of the pressure, the analysis of the determined pressure and the visual conveyance of the condition of the brake system are performed entirely on board the railcar.

By virtue of the event recorder being integrated into each railcar, no hardware needs to be carried by maintenance personnel. Just a quick glance at each car enables the maintenance personnel to effortlessly determine the operational condition of the brake system. Furthermore, the railcars may be tested not only while they are stationary, but also during normal operation of the train.

Still other desirable features of the invention will become apparent to those of ordinary skill in the art upon reading and understanding the following detailed description, taken with the accompanying drawings, wherein like reference numerals represent like elements throughout.

DETAILED DESCRIPTION OF THE INVENTION

The present invention will now be described with reference to the accompanying figures. It is to be understood that the specific system illustrated in the attached figures and described in the following specification is simply an exemplary embodiment of the present invention.

Figure 1:
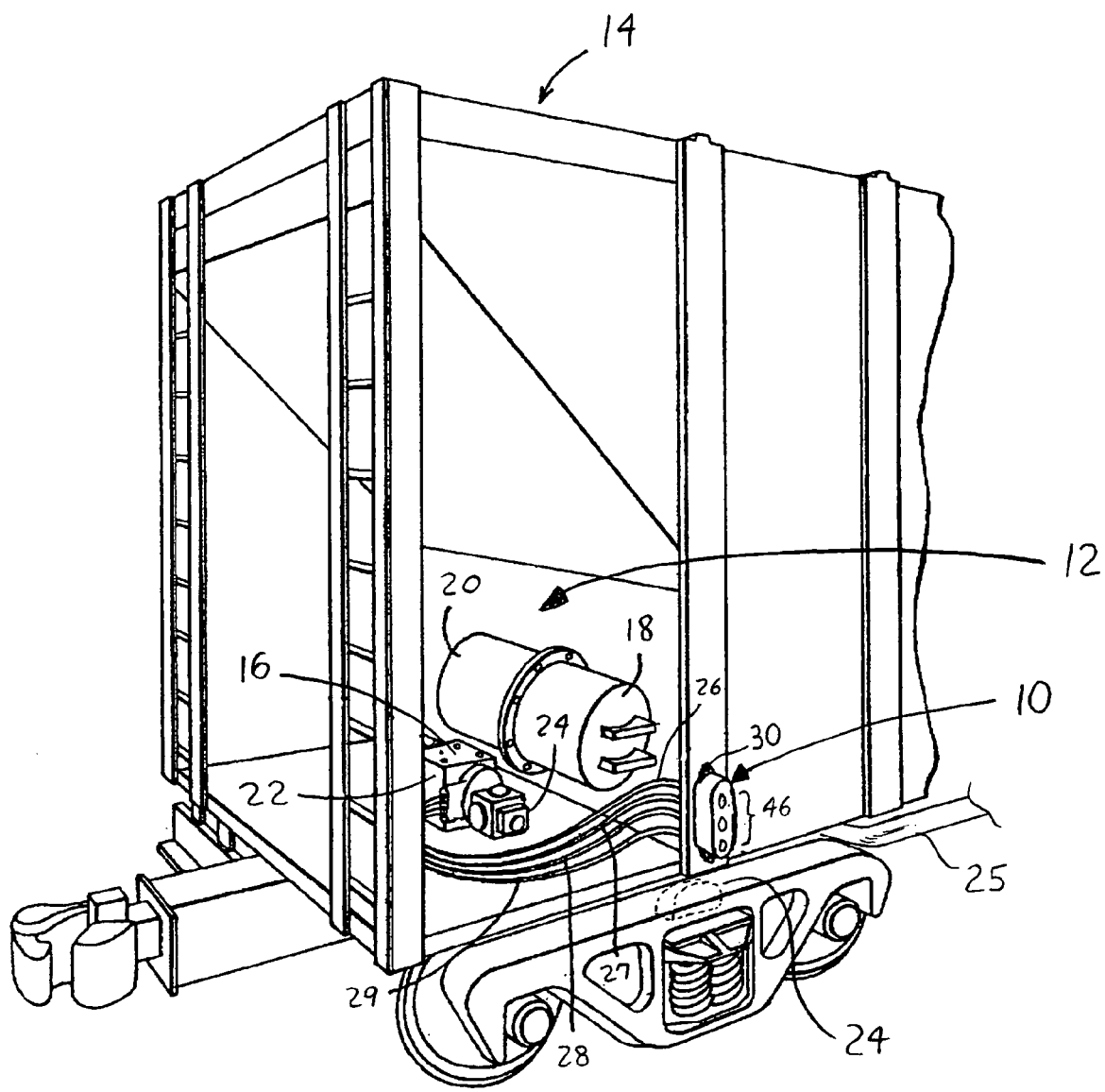
FIG. 1 is a perspective view of a railcar with a remote access testing arrangement having an event recorder connected thereto in accordance with the present invention.

With reference to FIG. 1, an event recorder 10 for monitoring the performance and/or operational condition of a brake system 12 of a railcar 14 is disclosed. As known in the art, the typical railcar 14 may include a platform having a control valve device 16 with an auxiliary reservoir 18 and an emergency reservoir 20 mounted thereon. The control valve device 16 includes a pipe bracket portion 22 having a service portion 23 mounted on one side and an emergency portion (not shown) mounted on the opposite side. Another side of the pipe bracket portion 22 is provided with openings to which a brake cylinder 24, a brake pipe 25, the auxiliary reservoir 18 and the emergency reservoir 20 are connected via piping. As is known in the art, the braking components responsible for movement and/or storage of air for braking purposes include the emergency reservoir 20, the auxiliary reservoir 18, the brake pipe 25, the brake cylinder 24 and the control valve device 16. These braking components are susceptible to wear and tear, which may result in air leakage leading to diminished braking performance (e.g., sticking brakes, no brakes).

Conduits 26, 27, 28 and 29 connect the control valve device 16 to an automated single car tester (ASCT) receiver 30, such as the ASCT receiver discussed in U.S. Pat. No. 5,709,436 to Scott. The conduits 26, 27, 28 and 29 are used to carry respective air from the emergency reservoir 20, the auxiliary reservoir 18, the brake pipe 25 and the brake cylinder 24 to the ASCT receiver 30 for purposes of testing the respective air pressures to determine the operational condition of the overall brake system 12. Such testing may include observing changes in pressure level over time. It is to be understood that any suitable ASCT receiver and conduit arrangement may be utilized in connection with the present invention. For example, the event recorder 10 may be directly attached to the ASCT receiver 30. Although the ASCT receiver 30 is the desirable point of connection for the event recorder 10, it is to be understood that other locations within the piping of the brake system 12 may be used to obtain the respective pressures to be tested.

The event recorder 10 is preferably mounted to a frame (e.g., side of the body, underframe, etc.) or directly to the control valve device 16 of the railcar 14 and is connected to the ASCT receiver 30, either directly, as shown in FIG. 1, or indirectly, via additional conduits. The event recorder 10 is fixedly mounted to the railcar 14 and is intended to be a relatively permanent fixture on the railcar. In other words, the event recorder 10 is not a portable testing device that is attached and reattached each time a test is conducted on the brake system 12. The event recorder 10 is consistently used on the same railcar 14, perhaps, for the life of the railcar 14 or unless replacement of the event recorder 10 is required. The event recorder 10 includes a housing to protect against external forces, such as weather and contact stress. Accordingly, the housing may be constructed of rigid material, such as metals or plastics.

Figure 2:
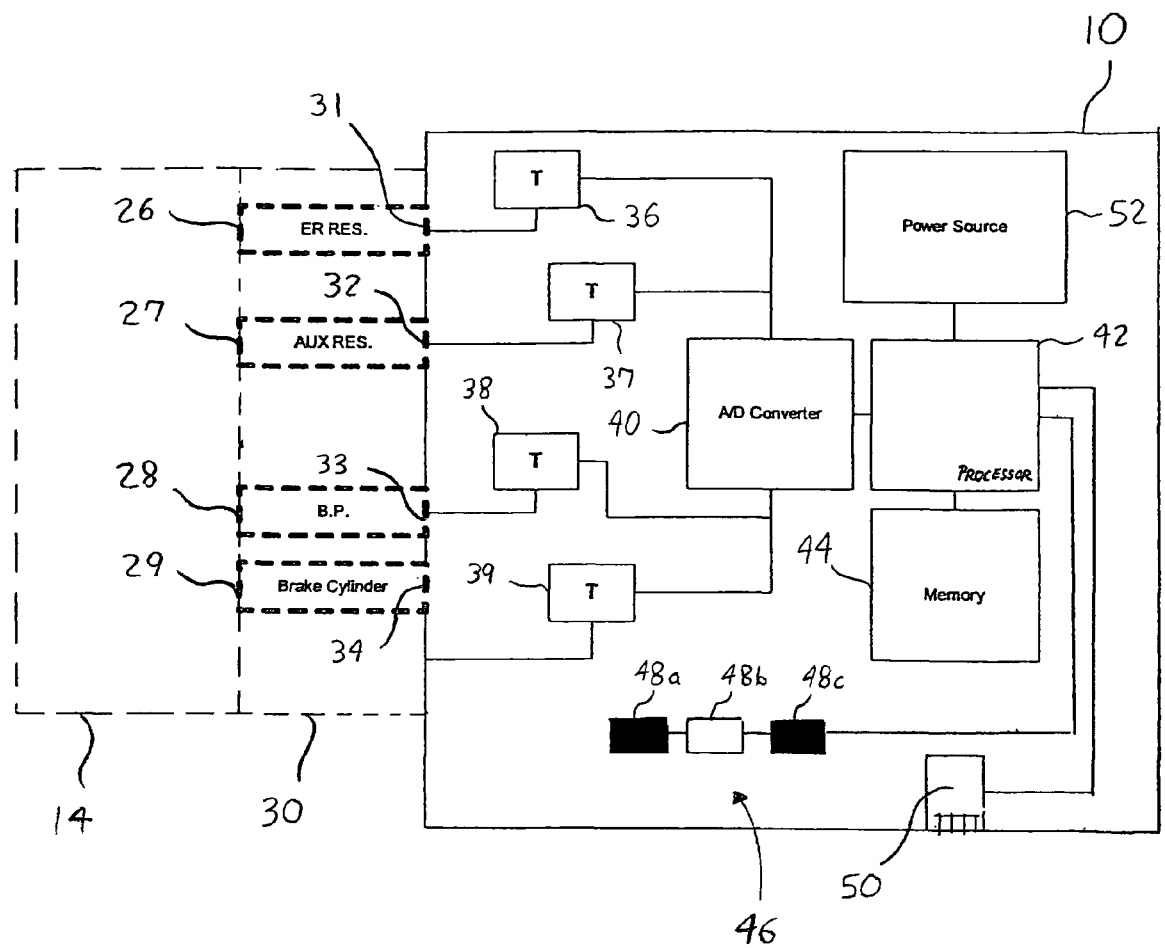
FIG. 2 is a schematic drawing of the event recorder of FIG. 1.

With continuing reference to FIG. 1, the event recorder 10 is schematically depicted in FIG. 2. In the preferred embodiment, the event recorder 10 includes ports 31, 32, 33 and 34 that are adapted to be fluidly connected to the conduits 26, 27, 28 and 29, respectively, for receiving a stream of air from the emergency reservoir 20, the auxiliary reservoir 18, the brake pipe 25 and the brake cylinder 24 of the brake system 12. Each port 31, 32, 33 and 34 includes a sensor for determining a pressure of the air received from the respective brake system component. A typical sensor for converting physical energy into an appreciable signal, such as an electrical voltage, is a transducer. In the preferred embodiment shown in FIG. 2, pressure transducers 36, 37, 38 and 39 are positioned downstream of each respective port 31, 32, 33 and 34. The transducers 36, 37, 38 and 39 are configured to transform the sensed air pressure into a corresponding analog electrical signal representative of the determined pressure. It is to be understood that other suitable sensors or mechanisms may be used. In an alternative embodiment, the event recorder 10 may include less than four sensors. For example, the event recorder 10 may incorporate a controlled valve arrangement to selectively control which stream of air from the four conduits 26, 27, 28 and 29 is to pass through to the sensor. In the preferred embodiment, the event recorder 10 includes an analog-to-digital converter 40 connected to each of the transducers 36, 37, 38 and 39. The analog-to-digital converter 40 is configured to convert each of the respective analog signals into a digital signal or data representative of the determined pressure. It is to be understood that the sensor may be configured to output a digital signal or data without the use of any intermediary conversion mechanisms.

The event recorder 10 includes a processor 42 connected to the analog-to-digital converter 40. The event recorder 10 also includes software operative on the processor 42 and other components of the event recorder 10. The software may reside as firmware on the processor 42 or in other suitable hardware, such as a storage medium 44. Exemplary storage mediums include, but are not limited to, volatile/non-volatile RAM, flash memory, a hard disk drive, an optical drive or other suitable storage mediums. The processor 42 may be configured to store the various determined pressure data on the storage medium 44 indefinitely or for a predetermined amount of time.

Via the appropriate software, the processor 42 is operative for analyzing the pressure data to determine an operational condition of the brake system 12. The software may include predetermined pressure data associated with the proper or desired functionality of each of the components of the brake system 12. For example, the emergency reservoir 20, the auxiliary reservoir 18, the brake pipe 25 and the brake cylinder 24 each have an air pressure value or values associated therewith that is necessary for operation of any one component or operation of the brake system 12 as a whole. This predetermined pressure value or values may serve as the basis for establishing various predefined ranges and/or tolerances of various operational conditions. For example, a decrease in air pressure for a certain component may correlate to reduced efficiency in that component, but may still allow for full functionality of the overall brake system 12. Conversely, a decrease in air pressure for a certain component may correlate to failure of that component, which results in failure of the overall brake system 12. The predefined ranges and/or tolerances of operational conditions are defined within the software as a function of expected pressures associated with the respective brake system components during corresponding operational conditions thereof. Accordingly, there may be predefined operational ranges relating to normal operation of the brake system 12 and abnormal operation of the brake system 12. Any other degrees of operational conditions may also be quantified via a predefined range or tolerance. The expected pressures may be based on pressure values of individual braking components in isolation or in relation to each other. Accordingly, the predefined ranges and/or tolerances may take into account proportionalities of air pressures in the brake system 12.

The processor 42 is operative for comparing the determined pressures to the expected pressures or predefined ranges/toleranaces of the individual components of the brake system 12, a combination of the individual components (e.g., summation, proportionality, etc.) or the brake system 12 as a whole. Based upon this comparison, the operational condition and performance of the brake system 12 may be established. Alternatively, the processor 42 may be operative for applying an algorithm, calculation or other suitable pressure comparison methodology, such as those known to a person having ordinary skill in the art, to the respective determined pressures to determine the operational condition of the brake system 12. Pressure comparison methodologies are disclosed in AAR S-461 and AAR S-486, both of which are specification publications published by the Association of American Railroads. It is to be understood that additional calculations may be performed on the pressure data taking into account other variables. The processor 42 is operative for establishing a signal, either analog or digital, representative of the operational condition of the brake system 12.

The event recorder 10 is configured to transmit the signal to an indicator 46 that is designed to visually convey the operational performance of the brake system 12 based upon the signal. The indicator 46 is one or more activatable visual indicia corresponding to one or more predefined operational condition status qualifiers associated with the corresponding one or more predefined ranges of operational conditions.

The visual indicia preferably appear on an external surface of the event recorder 10 and in such a manner as to be visible by personnel viewing the event recorder 10. The visual indicia is activatable upon receipt of the signal from the processor 42. For example, the visual indicia may be a lighting arrangement that is microprocessor controlled to activate certain portions of the lighting arrangement depending on what type of signal is received by the lighting arrangement. An exemplary lighting arrangement includes LEDs, such as LEDs 48a, 48b and 48c. Each LED 48a, 48b and 48c may be configured to exhibit one or more states. For example, each LED 48a, 48b and 48c may be on or off. An LED that is on may be static or flashing. Each LED 48a, 48b and 48c may be the same or different in color. Alternatively, a single LED may be used that is designed to emit various colors. In the preferred embodiment, the state of each LED 48a, 48b and 48c may be controlled by the type of signal transmitted to the lighting arrangement.

The predefined operational condition status qualifiers are designations relating to the status of the operational condition of the braking system 12. Such designations include but are not limited to "Normal Operation"; "Abnormal Operation" or "Equipment Malfunction"; and "Inspection Needed" or "Service Required". The visual indicia of the indicator 46 correspond to the various operational condition status qualifiers, or designations. The LEDs 48a, 48b and 48c are configured to emit a distinct color corresponding to the respective predefined operational condition status qualifier. For example, a green light, as provided by LED 48a, may designate "Normal Operation", a yellow light, as provided by LED 48b, may designate "Service Required" and a red light, as provided by LED 48c, may designate "Abnormal Operation". In operation, for example, if the determined pressure falls within the predefined range and/or tolerance corresponding to an operational condition representative of normal operation of the brake system 12, then the processor 42 is configured to transmit a signal to the indicator 46 to cause the LED 48a to activate. Accordingly, personnel will notice that the event recorder 10 is displaying a green light, indicating that the brake system 12 on the railcar 14 with which the event recorder 10 is associated with is operating normally. Activation of the other LEDs 48b and 48c follows a similar operation as discussed above in connection with LED 48a, with the exception of the operational condition of the brake system 12 and the corresponding signal transmitted by the processor 42. It is to be understood that any other suitable visual indicia or other lighting arrangement may be used. Similarly, other suitable operational condition status qualifiers may be designated and may be incorporated into the visual indicia display scheme of the event recorder 10.

The event recorder 10 may also include a communications port 50 communicatively connected to the processor 42. The communications port 50 is configured to transmit the determined pressure data stored on the storage medium 44 to an external device. The communications port 50 may be a wired or wireless data transmission interface. For example, the transfer of data, pressure or otherwise, may be achieved via a hardwired connection, such as through a USB cable, or via a wireless connection, such as Bluetooth. Other wireless technologies may include, but are not limited to, infrared, optical and microwave. The transfer of the data may be initiated manually or automatically. For example, personnel may establish a local communications link with the event recorder 10 using a hand-held personal digital assistant (e.g., Palm Pilot®, Treo®, etc.). Alternatively, the event recorder 10 may be configured to transmit the data, including the status of the brake system 12, at predetermined times to a remote computer. This may be accomplished by utilizing wireless networks, cellular telephone networks, or satellite communications. The brake system data may be made available via the Internet through a web server. Accordingly, the data may be remotely reviewed in real-time or near real-time. For example, alerts relating to the status of the brake system 12 may be formulated based upon the data and may be sent to cellular phones or other wireless devices if immediate attention to a particular brake system 12 is required.

The event recorder 10 includes a power source 52 for providing electrical energy to the various components of the event recorder 10. The power source 52 may be internal or external to the event recorder 10. The power source 52 may include, but is not limited to, a battery, an air generator powered by brake cylinder exhaust or a solar array. It is to be understood that more than one power source 52 may be used to provide the requisite power for operation of the event recorder 10.

In an alternative embodiment of the present invention, the event recorder 10 may be configured to monitor brake cylinder pressure downstream of an empty and load device to determine the operational condition of the empty and load device, such as SC-1, or other ELX empty and load equipment. In addition to downstream brake cylinder pressure, other vehicle parameters, such as car weight, may also be monitored and recorded. For example, car weight may be monitored by sensing, via appropriate sensing mechanisms and truck spring deflection. This derived data permits an improved evaluation of the empty and load equipment. A separate sensor may be used to detect the position of a retaining valve so that intentionally trapped air is not misread as a control valve failure. Another sensor may be added to a handbrake to detect when the handbrake is set and what the status of the handbrake is when the railcar is moving.

The invention has been described with reference to the preferred embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A fixedly mountable event recorder for a railcar for monitoring performance of a brake system thereof, the event recorder comprising:
    at least one port for receiving air from one or more brake system components;
    at least one sensor for determining a pressure of the air received from the one or more brake system components;
    a processor operative for analyzing the determined pressure to determine an operational condition of the brake system; and
    an indicator configured to visually convey the operational condition of the brake system.

2. The event recorder of claim 1, wherein the indicator includes a plurality of activatable visual indicia corresponding to a plurality of predefined operational condition status qualifiers associated with a corresponding plurality of predefined ranges of operational conditions.

3. The event recorder of claim 2, wherein the predefined ranges of operational conditions are defined as a function of expected pressures associated with the respective one or more brake system components during corresponding operational conditions thereof.

4. The event recorder of claim 3, wherein the processor is operative for comparing the determined pressures of the one or more brake system components to the expected pressures associated with the respective one or more brake system components to determine the operational condition of the brake system.

5. The event recorder of claim 3, wherein the processor is operative for applying an algorithm to the respective determined pressures to determine the operational condition of the brake system.

6. The event recorder of claim 2, wherein the plurality of predefined operational condition status qualifiers is selected from the group comprising normal operation, abnormal operation and inspection needed.

7. The event recorder of claim 6, wherein the plurality of activatable visual indicia includes a lighting arrangement.

8. The event recorder of claim 7, wherein the lighting arrangement is comprised of one or more LEDs.

9. The event recorder of claim 8, wherein the one or more LEDs are configured to emit a distinct color corresponding to a respective predefined operational condition status qualifier.

10. The event recorder of claim 2, wherein the processor is operative for establishing a signal representative of the operational condition of the brake system and the indicator is configured to visually convey the operational performance of the brake system based upon the signal representative of the operational condition of the brake system.

11. The event recorder of claim 1, wherein the at least one sensor is a transducer.

12. The event recorder of claim 11, further comprising an analog-to-digital converter configured to convert an analog voltage received from the transducer into a digital signal representative of the respective determined pressure.

13. The event recorder of claim 1, wherein the one or more brake system components is selected from the group comprising an emergency reservoir, an auxiliary reservoir, a brake pipe and a brake cylinder.

14. The event recorder of claim 1, further comprising memory for storing the determined pressure.

15. The event recorder of claim 1, further comprising a communications port communicatively connected to the processor and configured to transmit the determined pressure external from the event recorder.

16. The event recorder of claim 15, wherein the communications port is a wired or wireless data transmission interface.

17. The event recorder of claim 1, further comprising a power source, wherein the power source is a battery, an air generator powered by brake cylinder exhaust or a solar array.

18. A fixedly mountable event recorder for a railcar for monitoring performance of a brake system thereof, the event recorder comprising:
    a first, second, third and fourth port for receiving air from an emergency reservoir, an auxiliary reservoir, a brake pipe and a brake cylinder of the brake system, respectively;
    a first, second, third and fourth transducer each configured to determine the pressure of the respective air received and convert the determined pressure into a corresponding analog signal;
    an analog-to-digital converter communicatively connected to each of the transducers and configured to convert each of the analog signals into data;
    a processor communicatively connected to the analog-to-digital converter and operative for analyzing the data to determine an operational condition of the brake system and transmitting a signal representative of the operational condition; and
    a lighting arrangement connected to the processor, wherein the lighting arrangement corresponds to a plurality of predefined operational condition status qualifiers associated with a corresponding plurality of predefined ranges of operational conditions, wherein the predefined operational condition status qualifiers are equated to normal and abnormal operational conditions of the brake system, wherein the predefined ranges of operational conditions are defined as a function of expected pressures associated with the respective one or more brake system components during corresponding operational conditions thereof.

19. The event recorder of claim 18, further comprising memory for storing the data and a communications port configured to transmit the data external from the event recorder.

20. A system for monitoring performance of a brake system of a railcar, the system comprising a computer readable medium having stored thereon instructions which, when executed by a processor of the system, causes the processor to perform the steps of:

determining respective pressures of air received from an emergency reservoir, an auxiliary reservoir, a brake pipe and a brake cylinder of the brake system;

analyzing the determined respective pressures of air to determine an operational condition of the brake system; and conveying the condition of the brake system by either transmitting a signal to activate:
        a first visual indicia, wherein the first visual indicia correspond to a normal operational condition of the brake system; or
        a second visual indicia, wherein the second visual indicia correspond to an abnormal operational condition of the brake system, wherein the receipt of the respective air, the determination of the pressure, the analysis of the determined pressure and the visual conveyance of the condition of the brake system are performed entirely on board the railcar.

\* \* \* \* \*